June 23, 1970     F. FEROY     3,516,764

HYDRAULIC GEAR MECHANISMS

Filed Oct. 28, 1968

INVENTOR.
FINN FEROY
BY Edwin S. Hall
ATTORNEY

# United States Patent Office

3,516,764
Patented June 23, 1970

3,516,764
HYDRAULIC GEAR MECHANISMS
Finn Feroy, 3214 9th St. NE., Puyallup, Wash. 98371
Filed Oct. 28, 1968, Ser. No. 771,084
Int. Cl. F04c *1/08, 5/00, 15/02*
U.S. Cl. 418—19                                    4 Claims

ABSTRACT OF THE DISCLOSURE

A gear pump or motor with clearance space around the gears so that the gears can never contact the housing, with free-floating radially pressure-balanced seal members in the clearance space and separating the high and low fluid pressure regions, to minimize friction and wear and to permit either constant or variable displacement.

---

This invention relates to gear pumps and motors of the class that can be built with either constant or variable displacement.

To maintain pressure and avoid internal leakage in conventional gear pumps and motors, the gears must be located accurately in the housing with extremely close clearance. Generally, when subjected to high loading, fluid pressure on one side of the gears causes them to deflect and contact the housing on the opposite side, causing rubbing, friction and wear. This condition is most severe at starting a pump or motor under load, due to static friction lock. Ordinarily a gear motor, stopped with a load, cannot be restarted until the load is released.

Gear pumps and motors of conventional design cannot have variable displacement (by separation of the gears) since the gears must remain in their radial positions to maintain the seal between the tips of their teeth and the housing.

The main object of this invention is to provide a gear pump or motor having almost no friction, and one easy to start under load. Another object is to provide a gear pump or motor in which the gears can never contact the housing wall when operating. Another object is to provide free-floating radially pressure-balanced seal members that efficiently separate the high and low fluid pressure regions and which cannot have appreciable friction. Another object is to provide a gear pump or motor that can be built with either constant or variable displacement.

These and other objects will be apparent from the following specification in connection with the drawings in which.

Figure 1:
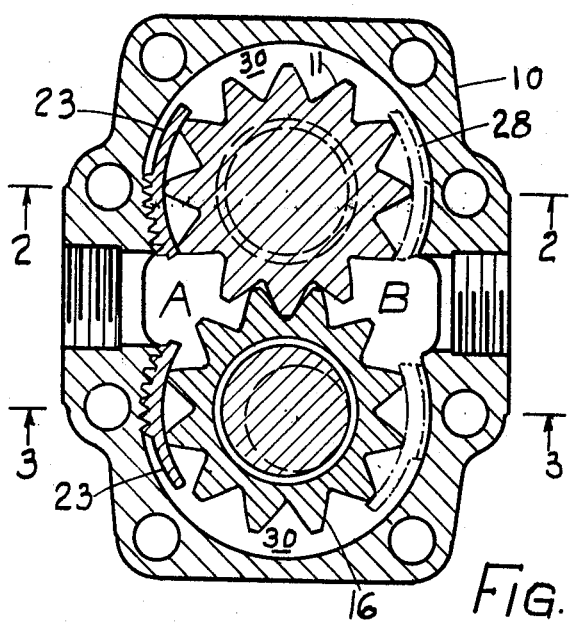
FIG. 1 is a plan view of the mechanism, a section on line 1—1 of FIG. 2.
Figure 4:
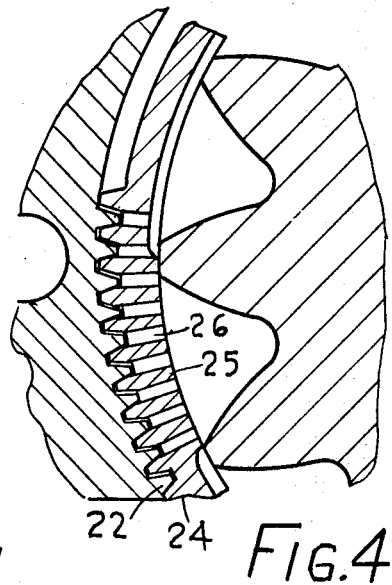
FIGS. 4 and 5 are enlarged sectional views showing the sealing member.
Figure 2:
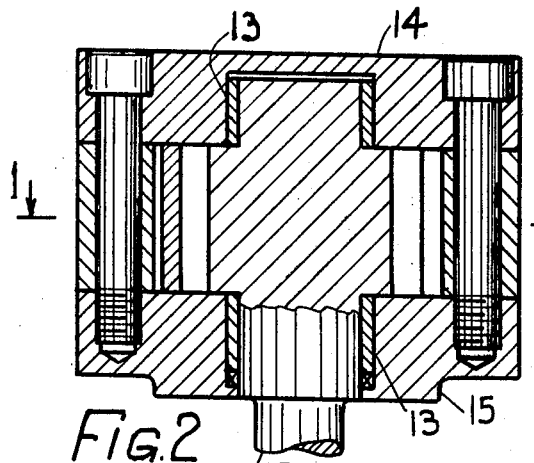
FIG. 2 is a section on line 2—2 of FIG. 1.

Referring to the drawings, gear pump or motor housing 10 has high pressure port A and low pressure port B. Drive gear 11 is fixed on shaft 12 operable in bearings 13 in side plates 14 and 15. Side plates 14 and 15 are held together on housing 10 by screws 21.

Idler gear 16 is operable on eccentric journal 17 of shaft 18. Shaft 18 can be rotated in bearings 20 by handle 27 to adjust the distance between gears 11 and 16 to vary the displacement.

On either side of each of ports A and B, a set of internal gear teeth 22 is formed in housing 10. Spur gear teeth 24, in mesh with a set of internal gear teeth 22, are formed on seal member 23 operable in clearance space 30 between the wall of housing 10 and the tips of the teeth of gears 11 and 16. Spur gear teeth 24 may be formed on the same pitch diameter as internal gear teeth 22 in a pump or motor having constant displacement. In a pump or motor having variable displacement, spur gear teeth 24 are formed on a slightly smaller pitch diameter than that of internal gear teeth 22, so that seal member 23 may roll slightly when a change is made in the position of gear 11 or gear 16 either by deflection under load or by handle 27 when changing the displacement, and without losing the sealing contacts between internal gear teeth 22 and spur gear teeth 24.

Seal members 23 may be placed anywhere in clearance space 30, but are preferably placed adjacent ports A and B to minimize the side loading on gears 11 and 16. (If seal members 23 were placed midway between ports A and B, gears 11 and 16 would carry the maximum hydraulic side loading.)

In operation as a pump, gears 11 and 16 may rotate counterclockwise and clockwise respectively, carrying oil from low pressure port B around their peripheries to high pressure port A. In operation as a motor, high pressure oil in port A may drive gears 11 and 16 clockwise and counterclockwise respectively, and is carried from high pressure port A around the peripheries of gears 11 and 16, and discharged into low pressure port B.

In operation either as a pump or motor, the teeth of gears 11 and 16 mesh and prevent leakage of oil from high pressure port A to low pressure port B. Each seal member 23 is in sealing contact with the tips of the teeth on gears 11 and 16, and gear teeth 24 of seal member 23 are in sealing contact with internal gear teeth 22 of housing 10, to prevent leakage from high pressure port A to low pressure port B.

Figure 5:
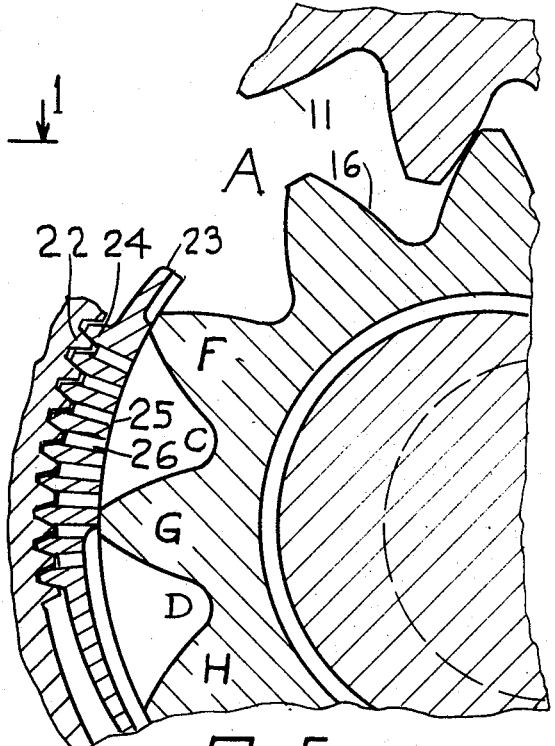

Referring to FIG. 5, outer portion of gear tooth F on gear 16 is shown in the position where it seals with seal member 23, to prevent leakage back to the low pressure region. Also, the high pressure fluid in port A forces seal member 23 to rest with all its gear teeth 24 in meshing contact with all gear teeth 22, forming a seal between these meshing teeth, to prevent leakage.

As gear tooth F of gear 16 advances, it separates from seal member 23 as the next gear tooth G goes into sealing contact with seal member 23. High pressure fluid now fills the space C between teeth F and G, and also flows thru all holes 26 in seal member 23 that connect with space C, so that the gear teeth 22 and 24 are subjected to high pressure fluid. Thus this portion of seal member 23, subjected to high pressure fluid on both sides, is hydraulically balanced radially. The space D between gear teeth G and H is subjected to low pressure fluid and is separated from the high pressure region by gear tooth G on one side of seal member 23 and by meshing teeth 22 and 24 on the other side, thru the corresponding holes 26, so that this portion of seal member 23 is also hydraulically balanced radially. The tangential unbalanced fluid pressure is carried on the relatively large contacts between internal gear teeth 22 and spur gear teeth 24, the specific loading so low as not to interfere with the free floating of seal member 23 in clearance space 30.

In gear motors and pumps, a simple way to vary the displacement is to change the center distance between the two gears. With involute gear teeth this change in center distance does not reduce the sealing contacts. In conventional gear motors and pumps, however, varying the displacement in this manner is impractical because the efficiency is dependent on maintaining the close clearance between the gears and the housing wall.

Figure 3:
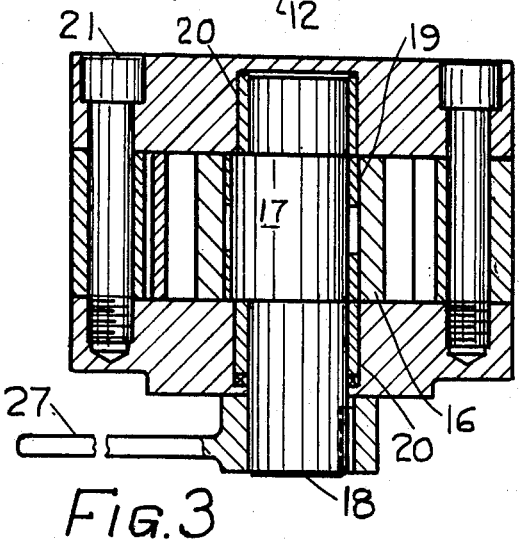
FIG. 3 is a section on line 3—3 of FIG. 1.

In this invention, the large clearance space 30 between the tips of the teeth of gears 11 and 16 and the wall of housing 10 permits the gears to be moved apart to reduce the displacement. As shown in FIGS. 1 and 3, the location of gear 11 is fixed but gear 16 (operable on eccentric journal 17) may be moved relative to gear 11 for partial separation of the teeth. Displacement is maximum when gears 11 and 16 are in closest mesh, and decreases as they are moved apart. A seal member 23 operating on gear 11 is almost fixed in position, its movement being due only to deflection of the parts under pressure loading. A seal member 23 operating on gear 16, however, being provided with external gear teeth 24 on a smaller pitch diameter than that of internal gear teeth 22, may rock or roll freely as the position of gear 16 is changed to vary the displacement, without impairing the seal between the involute surfaces of their teeth.

Having described the invention and its operation, it is obvious that the objects as stated have been attained. While a specific embodiment of the invention has been shown and described, it is understood that changes may be made in the construction and in the arrangement of the various parts without departing from the spirit or scope of the invention as expressed in the following claims.

I claim:

1. In a gear pump or motor mechanism having a housing with two parallel cylindrical bores and two gears operable therein and in mesh with each other, a substantial clearance space between the walls of said bores and the tips of the teeth of said gears, seal members in said clearance space in sealing contact with the tips of the teeth of said gears, internal gear teeth in the walls of said bores and external gear teeth in mesh therewith on said seal members, and holes thru said seal members insuring fluid pressure balance radially on said seal members.

2. Structure as claimed in claim 1, said external gear teeth formed on a smaller pitch diameter than the pitch diameter of said internal gear teeth.

3. Structure as claimed in claim 1, a drive shaft fixed to one of said two gears, and bearings in said housing operably carrying said drive shaft, a second shaft and bearings in said housing operably carrying it, an eccentric journal on said second shaft and operably carrying the second of the two gears, means for turning the second shaft to adjust the distance between the two gears to vary the displacement of their teeth, said external gear teeth on said seal members being formed on a smaller pitch diameter than the pitch diameter of said internal gear teeth to permit said seal member to rock while maintaining the sealing contacts between the said internal and external gear teeth whatever the position of said eccentric journal and the gear operable thereon.

4. A structure as claimed in claim 1, a drive shaft fixed to one of said two gears and bearings in said housing operably carrying said drive shaft, a second shaft and bearings in said housing operably carrying said second shaft, means for adjusting the position of said second shaft to adjust the distance between the two gears to vary the displacement of their teeth, said external gear teeth on said seal members being formed on a smaller pitch diameter than the pitch diameter of said internal gear teeth to permit said seal member to rock while maintaining the sealing contacts between the said internal and external gear teeth whatever the position of said adjusting means.

References Cited

UNITED STATES PATENTS

| | | | |
|---|---|---|---|
| 164,147 | 6/1875 | Conver | 103—126 |
| 1,783,209 | 12/1930 | Wilsey | 103—126 |
| 2,526,964 | 10/1950 | Muller | 103—126 |
| 2,837,031 | 6/1958 | Ilune | 103—126 |
| 3,067,691 | 12/1962 | Wiggermann | 103—120 |
| 3,429,270 | 2/1969 | Noell et al. | 103—126 |

DONLEY J. STOCKING, Primary Examiner

WILBUR J. GOODLIN, Assistant Examiner

U.S. Cl. X.R.

418—125